United States Patent [19]

Kurotobi

[11] Patent Number: 4,725,296

[45] Date of Patent: Feb. 16, 1988

[54] AIR CLEANER

[75] Inventor: Yohji Kurotobi, Saitama, Japan

[73] Assignee: Honda Giken Kogyo Kabushiki Kaisha, Tokyo, Japan

[21] Appl. No.: 865,517

[22] Filed: May 21, 1986

[30] Foreign Application Priority Data

May 29, 1985 [JP] Japan .................. 60-116283

[51] Int. Cl.$^4$ ............................. B01D 46/10
[52] U.S. Cl. ...................... 55/497; 55/502; 55/521
[58] Field of Search ............... 55/320, 321, 418, 416, 55/493, 497–499, 502, 509, 521; 210/493.1, 493.2, 493.3

[56]  References Cited

U.S. PATENT DOCUMENTS

| 3,861,894 | 1/1975 | Marsh | 55/493 |
| 3,926,595 | 12/1975 | Bockman | 55/418 |
| 4,359,330 | 11/1982 | Copely | 55/521 |
| 4,440,555 | 4/1984 | Chichester | 55/493 |
| 4,523,937 | 6/1985 | Brubaker | 55/509 |

FOREIGN PATENT DOCUMENTS

| 866764 | 6/1941 | France | 55/528 |
| 1433232 | 4/1976 | United Kingdom | 55/509 |

Primary Examiner—Bernard Nozick
Attorney, Agent, or Firm—Lyon & Lyon

[57] ABSTRACT

A plate-like air cleaner element housed in an air cleaner case divides the interior of the air cleaner case into an uncleaned-air chamber and a cleaned-air chamber. The air cleaner element can filter uncleaned air introduced in the uncleaned-air chamber to deliver cleaned air into the cleaner-air chamber. A plurality of partitions are disposed in the uncleaned-air chamber and jointly define an undulating air path in the uncleaned-air chamber for guiding the introduced uncleaned air therealong substantially over the entire flat surface of the air cleaner element, so that the uncleaned air can pass through the air cleaner element over a relatively large effective filtering area thereof. The air cleaner also includes an air guide plate disposed in the uncleaned-air chamber for guiding and straightening the incoming flow of uncleaned air deeply into the uncleaned-air chamber before the air is guided to flow toward the air outlet. The air cleaner case is comprised of a casing and a cover releasably clamped together and a flange on the air cleaner element is clamped therebetween in a gap of a predetermined size established by engagement of juxtaposed metal collars mounted in the casing and cover.

15 Claims, 5 Drawing Figures

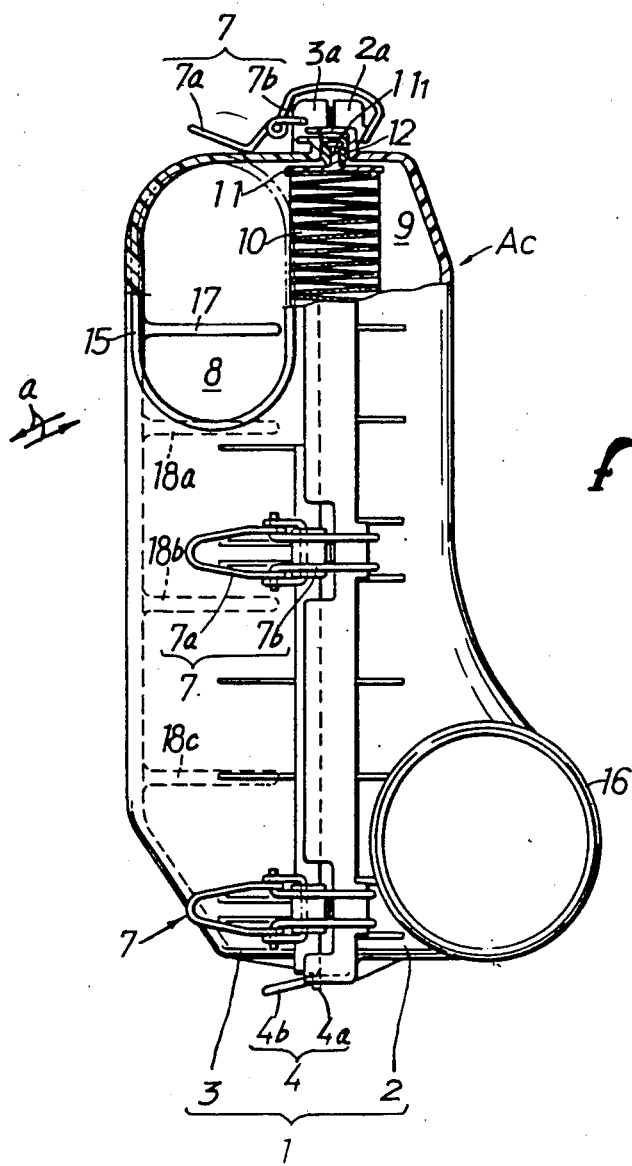
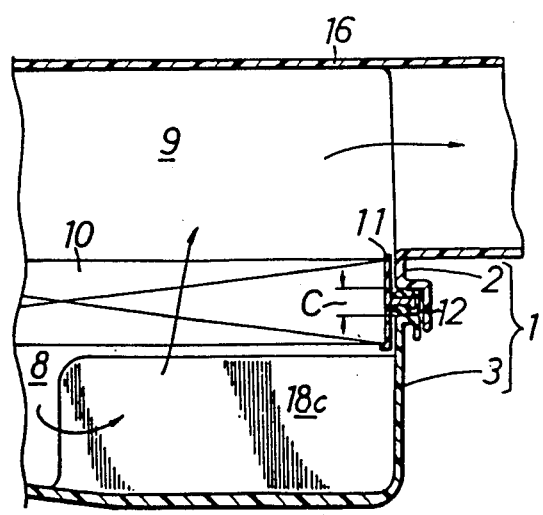
FIG. 2.
FIG. 3.

AIR CLEANER

The present invention relates to an air cleaner for use with an air intake system such as the air intake system of an automotive engine.

It is well known to provide an air cleaner coupled to the air intake system of an automotive engine wherein the air cleaner includes an air cleaner case and an annular or plate-like air cleaner element or filter for cleaning the air passing therethrough. To maximize the air cleaning efficiency of the air cleaner, it is necessary for the air cleaner element to have as large as effective filtering area as possible and for the uncleaned air be forced to flow uniformly through the air cleaner element over the entire effective filtering area. However, conventional air cleaners fail to provide a large effective filtering area within the limited space in the air cleaner case. Another problem is that the incoming uncleaned air tends to flow along the shortest path from the inlet to the outlet of the air cleaner through a localized region of the air cleaner element without reaching the other filter regions. Therefore, the air cleaning efficiency of conventional air cleaners has been comparatively low. Examples of various styles of prior art air cleaners of automotive engines are shown in U.S. Pat. Nos. 3,353,341; 3,552,103; 3,680,287; 3,686,837; and 3,877,907.

In view of the aforesaid deficiencies of the prior air cleaners, it is an object of the present invention to provide an air cleaner of simple construction having a high air cleaning efficiency.

According to one specific embodiment of the present invention, there is provided an air cleaner comprising an air cleaner case and a plate-like air cleaner element housed in the air cleaner case and dividing the interior of the air cleaner case into an uncleaned-air chamber and a cleaned-air chamber, the plate-like air cleaner element having a substantially flat surface exposed to the uncleaned-air chamber. The platelike air cleaner element can filter uncleaned air introduced in the uncleaned-air chamber to deliver cleaned air into the cleaned-air chamber. A plurality of partitions are disposed in the uncleaned-air chamber and jointly define an undulating air path in the uncleaned-air chamber for guiding the introduced uncleaned air therealong substantially over the entire flat surface of the air cleaner element. Since the uncleaned air introduced into the uncleaned-air chamber is guided to flow through the undulating air path over the flat surface of the air cleaner element, the uncleaned air can pass through the air cleaner element over a relatively wide effective filtering area thereof. Therefore, the air cleaner element does not incur a localized clogging of accumulated dust and the resistance to air flowing through the air cleaner element remains low for an extended period of time. As a result, the air cleaning efficiency of the air filter is increased, and the air filter remains in effective service for a long period of time.

The preferred embodiment of the air cleaner of this invention also includes an air guide plate disposed in the uncleaned-air chamber within a projected area of the cross-section of the air inlet and extending substantially in the direction of flow of uncleaned air in the air inlet for guiding and straightening the flow of uncleaned air into the uncleaned-air chamber. The air guide plate serves to deliver the incoming uncleaned air to a deeper region of the uncleaned-air chamber near a side wall thereof remote from the air inlet, before the air is guided to flow toward the air outlet. As a consequence, the air is prevented from shortcutting from the air inlet to the air outlet, and is allowed to pass through the air cleaner element over an increased air filtering area thereof. Accordingly, the guide plate is also effective in reducing the resistance to air flow through the air cleaner element and increasing the air cleaning efficiency of the air filter.

The above and other objects, features and advantages of the present invention will become more apparent from the following description when taken in conjunction with the accompanying drawings in which a preferred embodiment of the present invention is shown by way of illustrative example.

FIG. 2 is a side elevational view, partly broken away, of the air cleaner, as viewed in the direction of arrow II of FIG. 1;

FIG. 3 is an enlarged fragmentary cross-sectional view taken along line III—III of FIG. 1;

Figure 1:
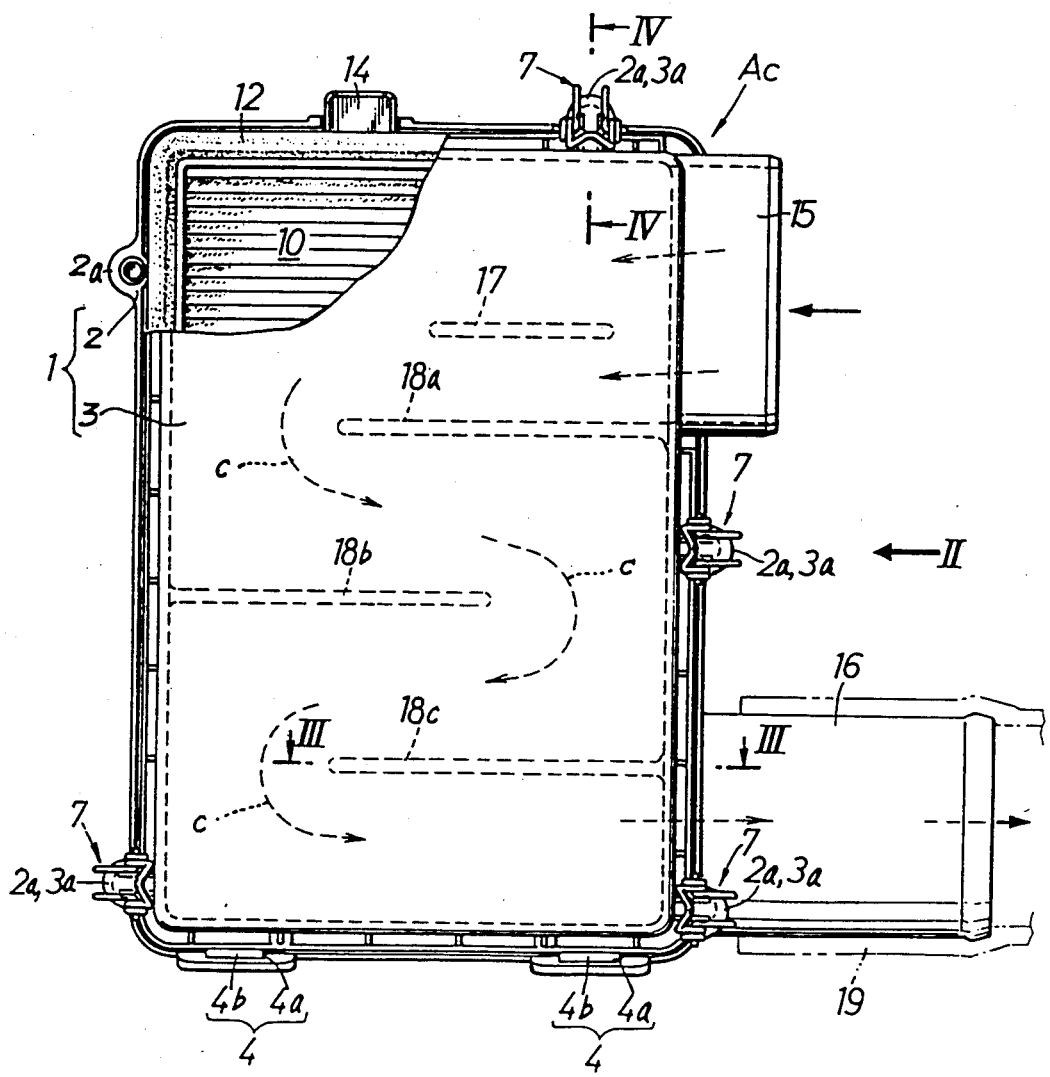
FIG. 1 is a front elevational view, partly broken away, of an air cleaner according to the present invention.

As illustrated in FIGS. 1 and 2, an air cleaner Ac according to the present invention has an air cleaner case 1 of synthetic resin comprising a casing 2 and a cover 3 which have open sides coupled to each other to provide a normally closed case structure. The casing 2 and the cover 3 also have lower edges pivotally connected together by a pair of hinges 4, 4 so that the cover 3 can be opened and closed through swinging movement in the directions of the arrows a (FIG. 2) about the hinges 4, 4 away from and toward the casing 2. Each of the hinges 4 comprises a slot 4a defined in the cover 3 and a tongue 4b on the casing 2 which is removably inserted in the slot 4a.

Figure 4:
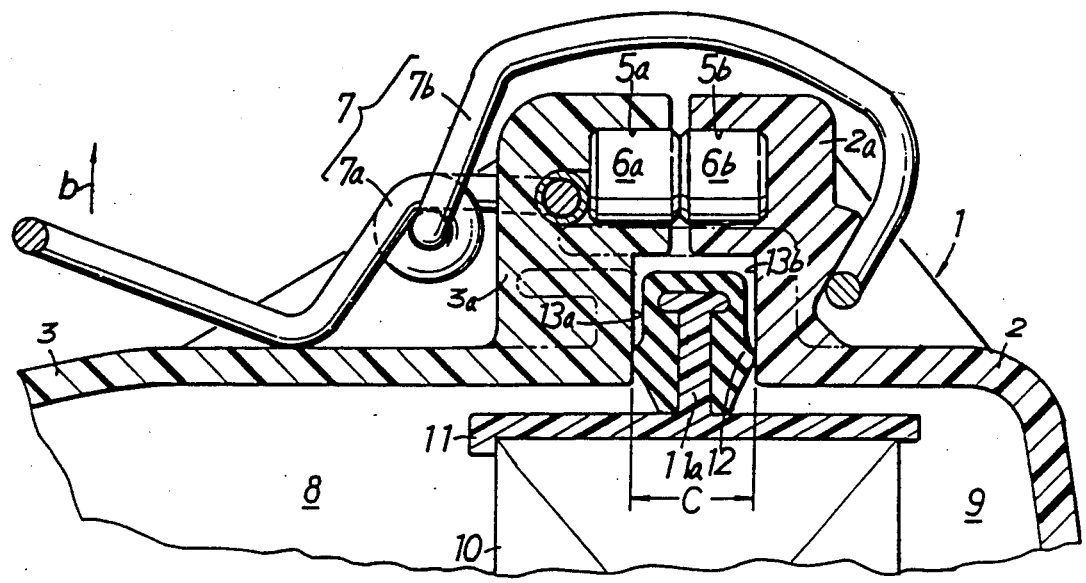
FIG. 4 is an enlarged fragmentary cross-sectional view taken along line IV—IV of FIG. 1.

The casing 2 and the cover 3 have a plurality of integral semicircular flanges 2a, 3a, respectively, projecting outwardly from side and upper edges thereof and positioned as pairs at spaced intervals therealong. The flanges 2a, 3a in each pair have inner end surfaces facing each other as shown in FIG. 4. The flanges 3a, 2a have respective cylindrical holes 5a, 5b opening at their inner end surfaces. Cylindrical metal pins or collars 6a, 6b are press-fitted respectively in the cylindrical holes 5a, 5b and have inner end surfaces projecting beyond the respective inner end surfaces of the flanges 3a, 2a in confronting relation to each other. When the casing 2 and the cover 3 are coupled together, the inner end surfaces of the metal collars 6a, 6b are held in abutment against each other to provide a constant seal gap C between the casing 2 and the cover 3.

The paired flanges 2a, 3a are associated with respective clamps 7 (except the clamp is not shown for the flanges 2a, 3a at the upper left in FIG. 1) for coupling the casing 2 and the cover 3 together. As shown in FIGS. 2 and 4, each of the clamps 7 is of a known structure including a swing lever 7a pivotally connected to the flange 3a and a hook 7b operatively joined to the swing lever 7a at its looped portions for engaging the flange 2a to hold the flanges 2a, 3a together. The pivoted end of the swing lever 7a extends through the flange 3a and is retained by the metal collar 6a against dislodgment from the flange 3a. The swing lever 7a and the hook 7b jointly constitute a so-called togglelink mechanism. When the swing lever 7a is turned in the direction of the arrow b in FIG. 4, the hook 7b is loosened to unlock the clamp 7, releasing the flange 3a from the flange 2a. Conversely, when the swing lever 7a is turned in the direction opposite to the direction of the arrow b, the hook 7b is caused by the swing lever 7a to bring the flanges 2a, 3a together until the metal collars 6a, 6b are pressed against each other. The clamp 7 is now locked to keep the casing 2 and the cover 3 fastened together.

As shown in FIG. 2, the cleaner case 1 houses a plate-like air cleaner element or filter 10 dividing the interior of the cleaner case 1 into an uncleaned-air chamber 8 in the cover 3 and a cleaned-air chamber 9 in the casing 2. The air cleaner element 10 is of a flat rectangular shape comprising a thin filter sheet folded or pleated into a zigzag form. The air cleaner element 10 is held by a frame 11 surrounding the outer periphery thereof. As illustrated in FIG. 4, the frame 11 has an integral flange 11a of T-shaped cross section projecting outwardly from the outer periphery thereof and extending fully therearound. The flange 11a is surrounded by an elastomeric seal member 12 of channel-shaped cross section extending entirely around the frame 11 along the flange 11a. The flange 11a and the elastomeric seal member 12 are positioned in the seal gap C and sandwiched between confronting inner surfaces 13a, 13b of the cover 3 and the casing 2 to provide an airtight seal in the seal gap C. Since the seal gap C is kept constant by the abutting metal collars 6a, 6b, the elastomeric seal member 12 is subject to a predetermined constant compressive load at all times.

The frame 11 has a grip 14 (FIG. 1) for removing the air cleaner element 11 from the air cleaner case 1 and the grip 14 projects outwardly from a side wall of the casing 2. Therefore, the air cleaner element 11 can easily be taken out of the air cleaner case 1 as it is disassembled by gripping and pulling the grip 14.

The air cleaner case 1 is connected to an inlet pipe 15 for introducing uncleaned air into the uncleaned air chamber 8 and an outlet pipe 16 for discharging cleaned air from the cleaned-air chamber 9.

As shown in FIG. 2, the inlet pipe 15, which is of elliptical cross section, is connected to and opens at a side wall of the cover 3 in communication with the uncleaned-air chamber 8, and the outlet pipe 16, which is of circular cross section, is connected to and opens at a side wall of the casing 2 in communication with the cleaned-air chamber 9. An air-flow straightening guide plate 17 is mounted on the inner wall surface of the cover 3 and positioned in the uncleaned-air chamber 8 within the projected area of the cross section of the inlet pipe 15. The guide plate 17 projects from the inner wall surface of the cover 3 toward the air cleaner element 10 and extends substantially parallel to the direction in which uncleaned air flows through the inlet pipe 15. A plurality (three are shown in FIGS. 1 and 2) of partitions 18a, 18b, 18c are also mounted on the inner wall surface of the cover 3 substantially parallel to the guide plate 17 and positioned in the uncleaned-air chamber 8 at spaced intervals between the inlet and outlet pipes 15, 16. The partitions 18a, 18b, 18c project from the inner wall surface of the cover 3 toward the substantially flat surface of the air cleaner element 10 which is exposed in the uncleaned-air chamber 8. The partitions 18a, 18b, 18c jointly define an undulating air path in the uncleaned-air chamber 8, as illustrated in FIG. 1.

The inlet pipe 15 is vented to the atmosphere, and the outlet pipe 16 is connected to the end of an air intake pipe 19 of the air intake system of an automotive engine. Vacuum developed in the air intake pipe 19 during operation of the automotive engine acts through the outlet pipe 16 in the cleaned-air chamber 9 to draw air through the air cleaner Ac.

Operation of the air cleaner Ac constructed in the manner described above is as follows:

While the automotive engine is in operation, vacuum developed in the air intake pipe 19 acts on the cleaned-air chamber 9, as described above, and also on the uncleaned-air chamber 8 through the air cleaner element 10 to draw uncleaned air into the uncleaned-air chamber 8 via the inlet pipe 15. The flow of introduced uncleaned air is guided by the guide plate 17 toward a deeper region of the uncleaned-air chamber 8 near a side wall thereof remote from the air inlet pipe 15, while the air is straightened by the guide plate 17, and then is guided successively by the partitions 18a, 18b, 18c to go along the undulating air path as indicated by the dotted arrows c in FIG. 1. Meanwhile, the uncleaned air is drawn through the air cleaner element 10 and filtered thereby as a result of the suction in the cleaned-air chamber 9. After dust is removed from the air by the air cleaner element 10, the air flows into the cleaned-air chamber 9 and is then delivered via the outlet pipe 16 into the air intake pipe 19, as shown in FIG. 3.

As described above, the uncleaned air in the uncleaned-air chamber 8 is guided by the guide plate 17 toward the deeper region of the chamber 8 and then turned back to flow through the undulating air path by being guided by the partitions 18a, 18b, 18c. Therefore, the uncleaned air is forced to flow uniformly over a wide effective filtering area on the air cleaner element 10 without short-cutting from the inlet pipe 15 to the outlet pipe 16, during which time the air flows through and is filtered by the air cleaner element 10. The air passing through the air cleaner element 10 in this manner is subjected to a relatively low resistance from the air cleaner element 10.

When the casing 2 and the cover 3 are joined to each other, as shown in FIG. 4, the metal collars 6a, 6b in plural pairs are held in against each other to keep the casing 2 and the cover 3 out of direct contact with each other, thereby maintaing the seal gap C at a constant predetermined amount. Therefore, the compressive force acting on the elastomeric seal member 12 is held constant at all times, so that the elastomeric seal member 12 is prevented from being permanently set by fatigue and provides a uniform sealing capability over a long period of time.

Figure 5:
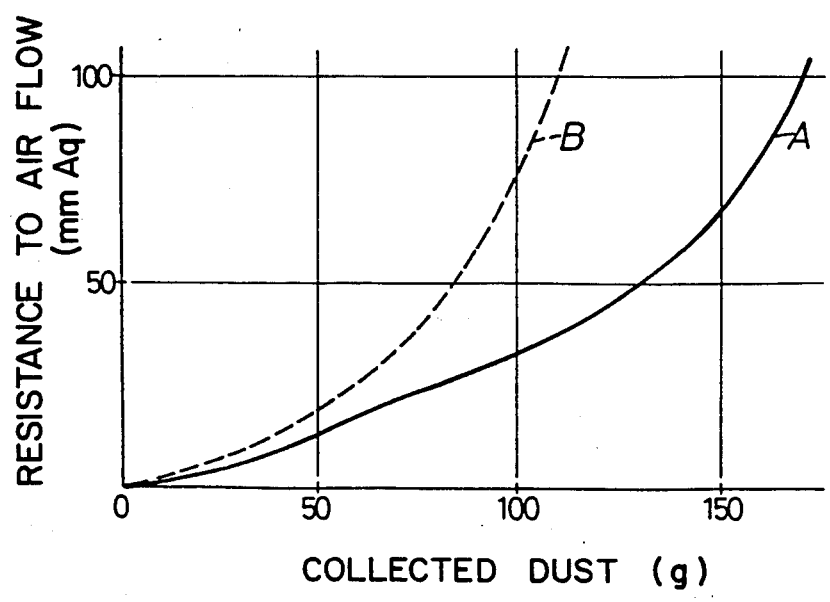
FIG. 5 is a graph showing the air cleaning characteristics of the air cleaner of the present invention.

FIG. 5 shows an air cleaning characteristic curve A of the air filter according to the present invention, which has the guide plate 17 and the partitions 18a, 18b, 18c, and an air cleaning characteristic curve B of a conventional air cleaner devoid of the guide plate 17 and the partitions 18a, 18b, 18c. The air cleaning characteristic curves A, B are indicative of the relationship between the amount of dust (in grams "g") collected by the air cleaner element and the resistant to air flow (in mmAq) through the air cleaner element. The graph of FIG. 5 clearly indicates that the air cleaning ability of the air cleaner according to the present invention is much better than that of the conventional air cleaner. According to the experimental results, the amount of all dust collected per unit area by the air cleaner element 10 in the air cleaner of the invention was 33.3 grams (g), whereas the amount of all dust collected per unit area by the air cleaner element in the conventional air cleaner was 22.0 grams (g).

Although a certain preferred embodiment has been shown and described, it should be understood that many changes and modifications may be made therein without departing from the scope of the appended claims.

What is claimed:

1. An air cleaner comprising:

an air cleaner case;

a plate-like filter element housing in said air cleaner case an dividing the interior of the air cleaner case into an uncleaned-air chamber and cleaned-air chamber, an inlet to said case communicating with said uncleaned-air chamber and an outlet from said base communicating with said cleaned-air chamber, said plate-like filter element having a substantially flat surface exposed in said uncleaned-air chamber, said plate-like filter element being capable of filtering uncleaned air introduced in said uncleaned-air chamber to deliver cleaned air into said cleaned-air chamber; and a plurality of partitions disposed in said uncleaned-air chamber and jointly defining an undulating flow path in the uncleaned-air chamber for guiding the introduced uncleaned air in alternate transverse directions along said flat surface of the filter element.

2. An air cleaner according to claim 1, wherein said partitions are mounted on an inner wall surface of said air cleaner case at spaced intervals and extend substantially parallel to each other, said partitions projecting from said inner wall surface toward said flat surface of said filter element.

3. An air cleaner according to claim 1, wherein said air cleaner case comprises a casing and a cover detachably coupled thereto, said casing and said cover having a plurality of pairs of flanges projecting outwardly from their outer peripheries and supporting metal collars mating with each other to provide a constant seal gap defined between said casing and said cover and extending therearound.

4. An air cleaner according to claim 3, including a frame surrounding said filter element and an elastomeric seal member mounted on said frame and disposed in and along said seal gap, providing an airtight seal in said seal gap.

5. An air cleaner according to claim 4, wherein said frame includes a flange of substantially T-shaped cross section disposed in said seal gap and surrounded by said elastomeric seal member.

6. An air cleaner comprising:

an air cleaner case;

a plate-like filter element housed in said air cleaner case and dividing the interior of the air cleaner case into an uncleaned-air chamber and a cleaned-air chamber, said plate-like filter element having a substantially flat surface exposed in said uncleaned-air chamber;

an air inlet coupled to said air cleaner case for introducing uncleaned air into said uncleaned-air chamber;

an air guide plate disposed in said uncleaned-air chamber within a projected area of the cross section of said air inlet and extending substantially in the direction of flow of uncleaned air in said air inlet for guiding and straightening the flow of uncleaned air into said uncleaned-air chamber;

a plurality of partitions disposed in said uncleaned-air chamber and jointly defined an undulating flow path in the uncleaned-air chamber for guiding the introduced uncleaned air in alternate transverse directions along said flat surface of the filter element; and an air outlet coupled to said air cleaner case for discharging air that has passed through and been filtered by said air cleaner element, from said cleaned-air chamber.

7. An air cleaner according to claim 6, wherein said guide plate is mounted on an inner wall surface of said air cleaner case, said guide plate projecting from said inner wall surface toward said filter element.

8. An air cleaner according to claim 6, wherein said partitions are mounted on an inner wall surface of said air cleaner case at spaced intervals and extend substantially parallel to each other, said partitions projecting from said inner wall surface toward said flat surface of said filter element.

9. An air cleaner according to claim 6, wherein said air cleaner case comprises a casing and a cover detachably coupled thereto, said casing and said cover having a plurality of pairs of flanges projecting outwardly from their outer peripheries and supporting metal collars mating with each other to provide a constant seal gap defined between said casing said cover and extending therearound.

10. An air cleaner according to claim 9, including a frame surrounding said filter element and an elastomeric seal member mounted on said frame and disposed in and along said seal gap, providing an airtight seal in said seal gap.

11. An air cleaner according to claim 10, wherein said frame includes a flange of substantially T-shaped cross section disposed in said seal gap and surrounded by said elastomeric seal member.

12. An air cleaner according to claim 6, wherein air inlet is located on said air cleaner case remote from the location of said air outlet.

13. An air cleaner according to claim 12 wherein said undulating air path defined by said plurality of partitions extends from said location of the air inlet to said location of the air outlet.

14. An air cleaner comprising:

an air cleaner case including a casing and a cover detachably coupled thereto, said casing and said cover each having flanges projecting outwardly from the peripheries thereof;

a filter element housed in said case, said filter element including a peripheral frame;

an elastmeric seal member on said frame and arranged to be gripped by said casing and cover flanges;

said flanges each supporting metal collars mating with each other to define a constant seal gap between said flanges and said elastomeric member; and an inlet and an outlet formed each on one of said casing and said cover respectively to communicate with said air cleaner case on opposite sides of said filter element.

15. An air cleaner according to claim 14, wherein said frame includes a flange of substantially T-shaped cross section and surrounded by said elastomeric seal member.

* * * * *